US012581070B2

(12) United States Patent     (10) Patent No.:    US 12,581,070 B2

Kotra et al.                   (45) Date of Patent:      Mar. 17, 2026

(54) EDGE OFFSET FOR CROSS COMPONENT SAMPLE ADAPTIVE OFFSET (CCSAO) FILTER

(71) Applicant: QUALCOMM Incorporated, San Diego, CA (US)

(72) Inventors: Venkata Meher Satchit Anand Kotra, Munich (DE); Nan Hu, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/930,331

(22) Filed: Sep. 7, 2022

(65) Prior Publication Data

US 2023/0101318 A1     Mar. 30, 2023

Related U.S. Application Data

(60) Provisional application No. 63/250,141, filed on Sep. 29, 2021, provisional application No. 63/262,272, filed on Oct. 8, 2021.

(51) Int. Cl.
    *H04N 19/117*        (2014.01)
    *H04N 19/186*        (2014.01)

(52) U.S. Cl.
    CPC ......... *H04N 19/117* (2014.11); *H04N 19/186* (2014.11)

(58) Field of Classification Search
    CPC ........................... H04N 19/117; H04N 19/186
    See application file for complete search history.

(56) References Cited

U.S. PATENT DOCUMENTS

| | | | | |
|---|---|---|---|---|
| 2015/0103930 A1* | 4/2015 | Jang | ..................... | H04N 19/593 |
| | | | | 375/240.27 |
| 2018/0352225 A1* | 12/2018 | Guo | ..................... | H04N 19/186 |
| 2022/0182635 A1* | 6/2022 | Li | ........................ | H04N 19/186 |
| 2022/0295069 A1* | 9/2022 | Li | ........................ | H04N 19/132 |

(Continued)

FOREIGN PATENT DOCUMENTS

| | | | | |
|---|---|---|---|---|
| WO | WO-2013107314 A1 * | 7/2013 | ........... | H04N 19/114 |
| WO | 2022117010 A1 | 6/2022 | | |
| WO | 2022178424 A1 | 8/2022 | | |

(Continued)

OTHER PUBLICATIONS

International Search Report and Written Opinion—PCT/US2022/076105—ISA/EPO—Dec. 5, 2022.

(Continued)

*Primary Examiner* — Dave Czekaj
*Assistant Examiner* — Shanika M Brumfield
(74) *Attorney, Agent, or Firm* — Polsinelli LLP

(57) ABSTRACT

Systems and techniques are described for processing video data. For instance, a process can include obtaining video data. The process can further include determining a classification band for a first sample of the video data using at least chroma information from the first sample, collocated luma information and collocated chroma information. The process can also include filtering at least the first sample of the video data based on the classification band.

27 Claims, 12 Drawing Sheets

900

Obtain Video Data
902

Determine A Classification Band For A First Sample Of The Video Data Using At Least Chroma Information From The First Sample, Collocated Luma Information, And Collocated Chroma Information
904

Filter At Least The First Sample Of The Video Data Based On The Classification Band
906

(56)  References Cited

U.S. PATENT DOCUMENTS

2023/0308652 A1*  9/2023  Kuo .................. H04N 19/1883
                                                        375/240.02
2023/0319315 A1*  10/2023  Kuo .................... H04N 19/172
                                                        375/240.29

FOREIGN PATENT DOCUMENTS

WO      WO-2022164757 A1 *  8/2022   ........... H04N 19/117
WO      WO-2022197794 A1 *  9/2022   ........... H04N 19/119
WO      WO-2022221456 A1 *  10/2022  ........... H04N 19/117

OTHER PUBLICATIONS

Kuo C-W (Kwai)., et al., "AHG12: Cross-Component Sample
Adaptive Offset", 22. JVET Meeting, Apr. 20, 2021-Apr. 28, 2021,
Teleconference, (The Joint Video Exploration Team of ISO/IEC
JTC1/SC29/WG11 and ITU-T SG.16), No. JVET-V0153, m56671,
Apr. 22, 2021, XP030294395, p. 1-p. 2, pp. 1-4.
Zhao X., et al., "Study on Coding Tools Beyond AV1", 2021 IEEE
International Conference on Multimedia and Expo (ICME), IEEE,
Jul. 5, 2021, pp. 1-6, XP034125211, 6 Pages, section 3.4.

* cited by examiner

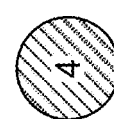
Collocated V
Collocated U
FIG. 3
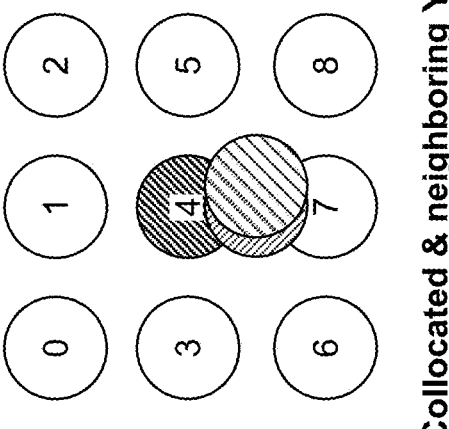
Collocated & neighboring Y Determine a value for Num_bands for frame
602

Is value of Num_bands less than a first threshold value (e.g., a value of 4)?
604

No

Yes

Band determined based on collocated luma sample and Eq. 5
606

Is value of Num_bands between a second threshold value (e.g., a value of 4) and a third threshold value (e.g., a value of 5)?
608

No

Yes

Band determined based on current chroma sample and Eq. 6
610

Value of Num_bands is between a fourth threshold value (e.g., a value of 6) and a maximum threshold value (e.g., a value of 7)
612

Yes

Band determined based on collocated chroma sample and Eq. 7
614

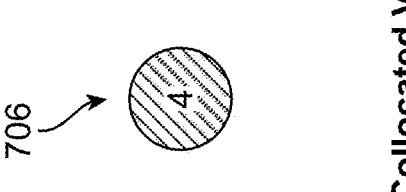
Collocated V
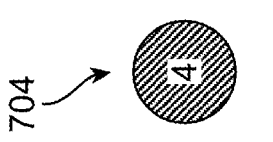
Collocated U
FIG. 7
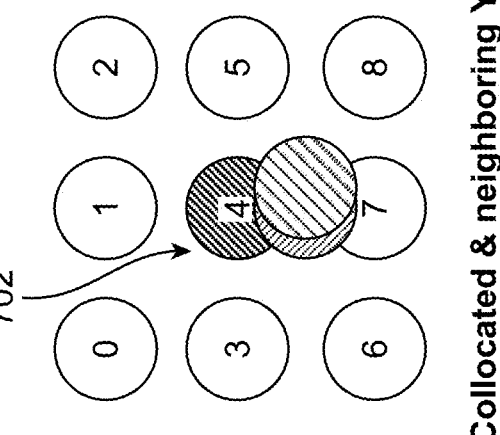
Collocated & neighboring Y

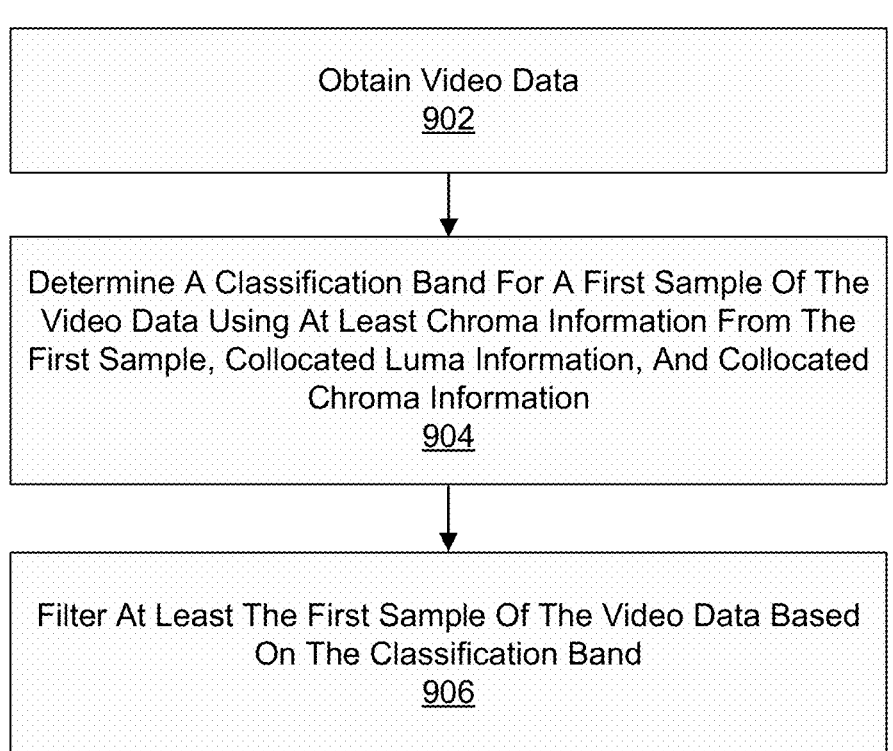
Obtain Video Data
902
Determine A Classification Band For A First Sample Of The Video Data Using At Least Chroma Information From The First Sample, Collocated Luma Information, And Collocated Chroma Information
904
Filter At Least The First Sample Of The Video Data Based On The Classification Band
906
FIG. 9

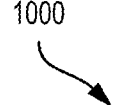
1000
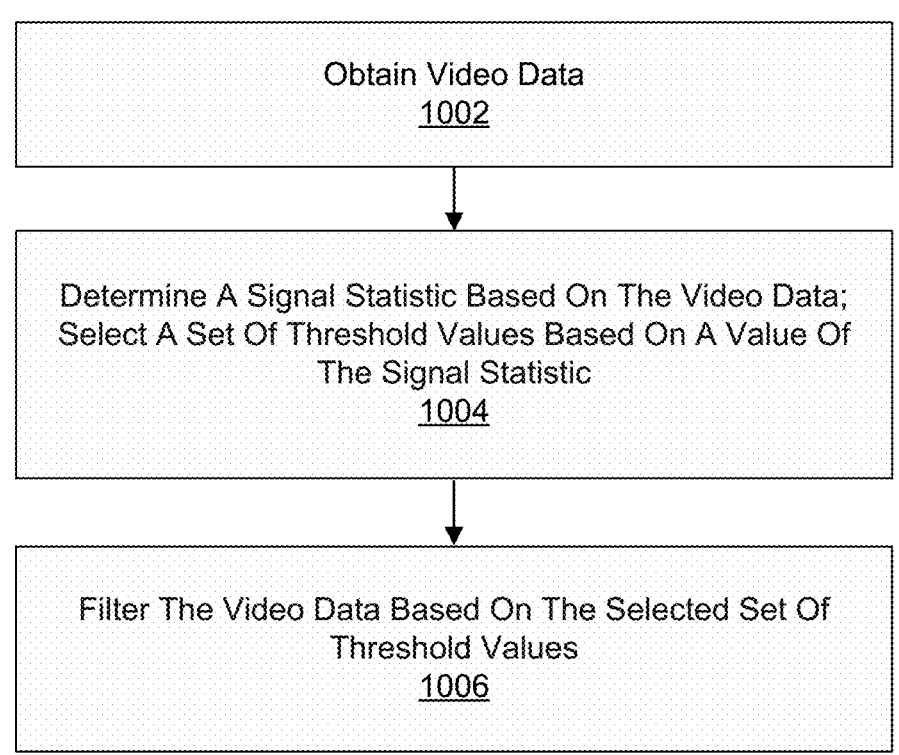
Obtain Video Data
1002
Determine A Signal Statistic Based On The Video Data;
Select A Set Of Threshold Values Based On A Value Of
The Signal Statistic
1004
Filter The Video Data Based On The Selected Set Of
Threshold Values
1006
FIG. 10

EDGE OFFSET FOR CROSS COMPONENT SAMPLE ADAPTIVE OFFSET (CCSAO) FILTER

CROSS-REFERENCE TO RELATED APPLICATIONS

This application claims the benefit of U.S. Provisional Application No. 63/250,141, filed Sep. 29, 2021, and also claims the benefit of U.S. Provisional Application No. 63/262,272, filed Oct. 8, 2021, both of which are hereby incorporated by reference, in their entirety and for all purposes.

TECHNICAL FIELD

This application is related to video coding (e.g., encoding and/or decoding of video data). For instance, aspects of the application relate to determining and/or utilizing an edge offset for a filter, such as a cross component sample adaptive offset (CCSAO) filter.

BACKGROUND

Many devices and systems allow video data to be processed and output for consumption. Digital video data generally includes large amounts of data to meet the demands of video consumers and providers. For example, consumers of video data desire video of high quality, fidelity, resolution, frame rates, and the like. As a result, the large amount of video data that is required to meet these demands places a burden on communication networks and devices that process and store the video data.

Various video coding techniques may be used to compress video data. Video coding techniques can be performed according to one or more video coding standards. For example, video coding standards include high-efficiency video coding (HEVC), advanced video coding (AVC), moving picture experts group (MPEG) 2 part 2 coding, VP9, Alliance of Open Media (AOMedia) Video 1 (AV1), Essential Video Coding (EVC), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with improved coding accuracy or efficiency are needed.

SUMMARY

Systems and techniques are described herein for improved video processing, such as video encoding and/or decoding. For example, a system can determine and/or utilize an edge offset for a filter (e.g., an in-loop filter), such as a cross component sample adaptive offset (SAO) filter (CCSAO).

In one illustrative example, an apparatus for processing video data is provided. The apparatus comprising: at least one memory; and at least one processor (e.g., configured in circuitry) coupled to the at least one memory. The at least one processor is configured to: obtain video data; determine a classification band for a first sample of the video data using at least chroma information from the first sample, collocated luma information, and collocated chroma information; and filter at least the first sample of the video data based on the classification band.

In another example, a method for processing video data, the method comprising: obtaining video data; determining a classification band for a first sample of the video data using at least chroma information from the first sample, collocated luma information, and collocated chroma information; and filtering at least the first sample of the video data based on the classification band.

As another example, a non-transitory computer-readable medium having stored thereon instructions that, when executed by at least one processor, cause the at least one processor to: obtain video data; determine a classification band for a first sample of the video data using at least chroma information from the first sample, collocated luma information, and collocated chroma information; and filter at least the first sample of the video data based on the classification band.

In another example, an apparatus for processing video data is provided. The apparatus includes: means for obtaining video data; means for determining a classification band for a first sample of the video data using at least chroma information from the first sample, collocated luma information, and collocated chroma information; and means for filtering at least the first sample of the video data based on the classification band.

As another example, an apparatus for processing video data. The apparatus comprising: at least one memory; and at least one processor coupled to the at least one memory. The at least one processor is configured to: obtain video data; determine a signal statistic based on the video data; select a set of threshold values based on a value of the signal statistic; and filter the video data based on the selected set of threshold values.

In another example, a method for processing video data, the method comprising: obtaining video data; determining a signal statistic based on the video data; selecting a set of threshold values based on a value of the signal statistic; and filtering the video data based on the selected set of threshold values.

As another example, a non-transitory computer-readable medium having stored thereon instructions that, when executed by one or more processors, cause the at one or more processors to: obtain video data; determine a signal statistic based on the video data; select a set of threshold values based on a value of the signal statistic; and filter the video data based on the selected set of threshold values.

In another example, an apparatus for processing video data. The apparatus includes means for obtaining video data; means for determining a signal statistic based on the video data; selecting a set of threshold values based on a value of the signal statistic; and means for filtering the video data based on the selected set of threshold values.

In some aspects, one or more of the apparatuses described herein can include, can be, or can be part of a mobile device (e.g., a mobile telephone or so-called "smart phone", a tablet computer, or other type of mobile device), a network-connected wearable device, an extended reality device (e.g., a virtual reality (VR) device, an augmented reality (AR) device, or a mixed reality (MR) device), a personal computer, a laptop computer, a server computer (e.g., a video server or other server device), a television, a vehicle (or a computing device or system of a vehicle), a camera (e.g., a digital camera, an Internet Protocol (IP) camera, etc.), a multi-camera system, a robotics device or system, an aviation device or system, or other device. In some aspects, the system includes at least one camera for capturing one or more images or video frames. For example, the system can include a camera (e.g., an RGB camera) or multiple cameras for capturing one or more images and/or one or more videos including video frames. In some aspects, the system includes a display for displaying one or more images, videos, notifications, or other displayable data. In some aspects, the system includes a transmitter configured to transmit one or more video frame and/or syntax data over a transmission medium to at least one device. In some aspects, the system described above can include one or more sensors. In some aspects, the processor includes a neural processing unit (NPU), a central processing unit (CPU), a graphics processing unit (GPU), and/or other processing device or component.

The foregoing, together with other features and examples, will become more apparent upon referring to the following specification, claims, and accompanying drawings.

BRIEF DESCRIPTION OF THE DRAWINGS

Examples of various implementations are described in detail below with reference to the following figures:

FIG. 3 is a diagram illustrating examples of candidate positions used for the CCSAO classifier, in accordance with examples described herein;

FIG. 6 is a flow diagram illustrating an example edge classification process, in accordance with aspects of the present disclosure.

FIG. 7 is a diagram illustrating an example of samples used in deriving the band information for the combined edge/band based classifier, in accordance with examples described herein;

FIG. 9 is a flow diagram illustrating an example of a process for processing video data, in accordance with aspects of the present disclosure;

FIG. 10 is a flow diagram illustrating another example of a process for processing video data, in accordance with aspects of the present disclosure;

DETAILED DESCRIPTION

Figure 1:
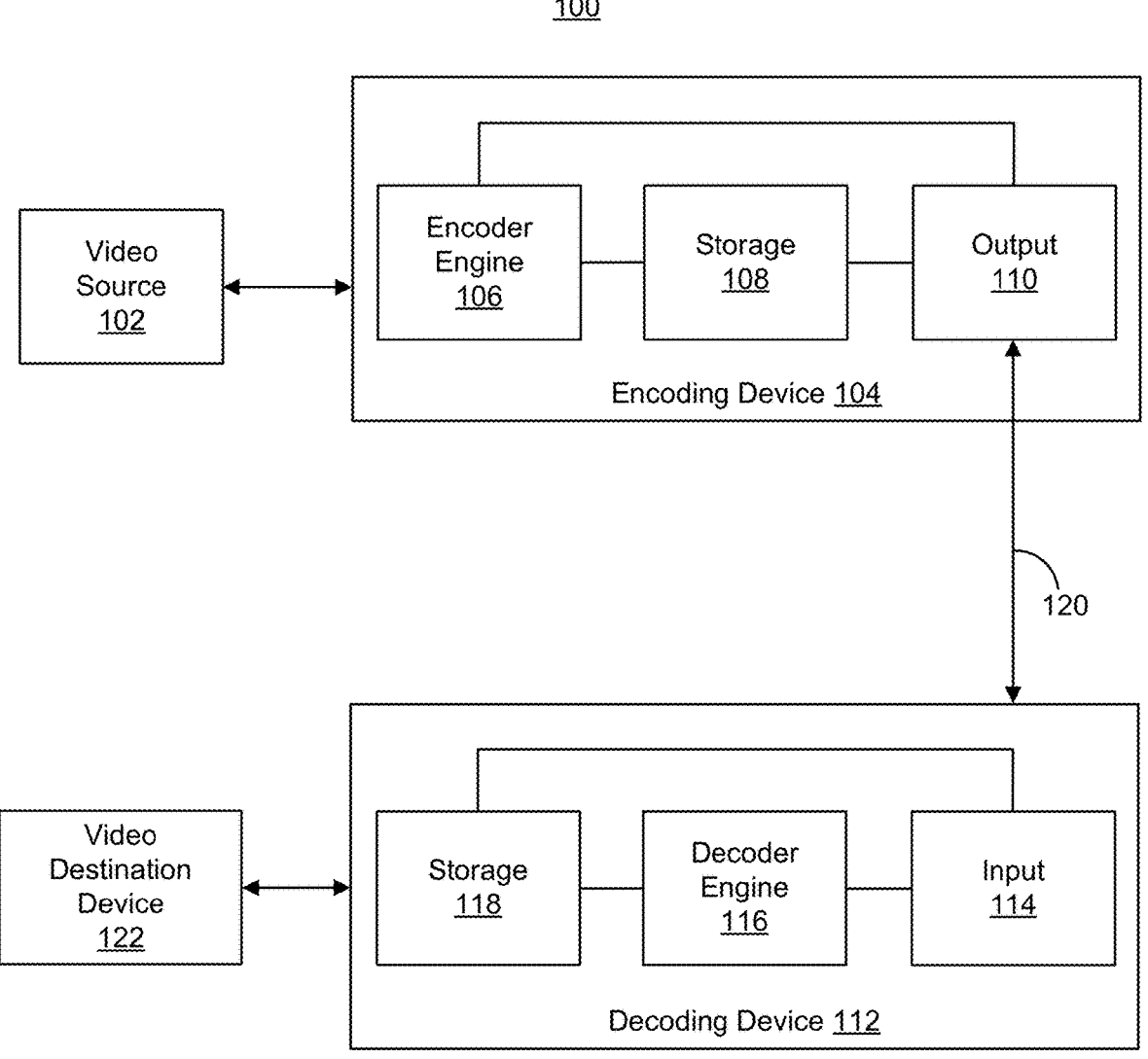
FIG. 1 is a block diagram illustrating an encoding device and a decoding device, in accordance with some examples.

Certain aspects and examples of the disclosure are provided below. Some of these aspects and examples may be applied independently and some of them may be applied in combination as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description of various examples will provide those skilled in the art with an enabling description for implementing a particular example. It should be understood that various changes may be made in the function and arrangement of elements without departing from the spirit and scope of the application as set forth in the appended claims.

Video coding devices implement video compression techniques to encode and decode video data efficiently. Versatile Video Coding (VVC), for example, is a latest video coding standard that was developed by Joint Video Experts Team (WET) of ITU-T and ISO/IEC to achieve substantial compression capability beyond HEVC for a broaden range of applications. The VVC specification has been finalized in July 2020 and published by both ITU-T and ISO/IEC. The VVC specification specifies normative bitstream and picture formats, high level syntax (HLS) and coding unit level syntax, and the parsing and decoding process. VVC also specifies profiles/tiers/levels (PTL) restrictions, byte stream format, hypothetical reference decoder and supplemental enhancement information (SEI) in the annex. Recently, NET has been developing an Enhanced Compression Model (ECM) software to enhance compression capability beyond VVC. The set of coding tools in the ECM software encompasses all functional blocks in the hybrid video coding framework, including intra prediction, inter prediction, transform and coefficient coding, in-loop filtering, and entropy coding.

Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As described in more detail below, systems, apparatuses, methods (also referred to as processes), and computer-readable media (collectively referred to as "systems and techniques") are described herein for improving filter design, such as a cross component sample adaptive offset (CCSAO) filter design. For instance, the systems and techniques can include determining and/or utilizing an edge offset for a filter (e.g., an in-loop filter), such as the CCSAO filter. In some aspects, a change in a band calculation can be utilized to improve filter design (e.g., the CCSAO design). Additionally or alternatively, in some aspects, a change in a classification calculation (e.g., class_idx) calculation is provided to improve filter design (e.g., the CCSAO design). Additionally or alternatively, in some aspects, an improved threshold selection technique is provided to improve filter design (e.g., the CCSAO design). In some aspects, the systems and techniques described herein can include signaling of set information (e.g., a set index syntax element, which can be denoted as set_idx) at a block (e.g., CTB, CU, PU, etc.) level. In some aspects, joint class/set information can be optimized for all components (e.g., the Y, Cb, and Cr components). The various aspects of the systems and techniques described herein can be performed or used individually or in any combination. Further details related to various aspects of the disclosure are described below.

The systems and techniques described herein can be applied to one or more of a variety of block-based video coding techniques in which video is reconstructed on block-by-block basis. For example, the systems and techniques described herein can be applied to any of the existing video codecs (e.g., VVC, HEVC, AVC, or other suitable existing video codec), and/or can be an efficient coding tool for any video coding standards being developed and/or future video coding standards. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the systems and techniques may operate according to a proprietary video codec/format, such as AV1, extensions of AVI, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Various aspects of the systems and techniques described herein will be discussed herein with respect to the figures.

FIG. 1 is a block diagram illustrating an example of a system 100 including an encoding device 104 and a decoding device 112 that can perform one or more of the techniques described herein. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, the system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 106.

Once the pictures of the video data are partitioned into CUs, the encoder engine 106 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and the decoder engine 116 (described in more detail below) may be configured to operate according to VVC. According to VVC, a video coder (such as the encoder engine 106 and/or the decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoding device 104 and decoding device 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoding device 104 may further partition a superblock into smaller coding blocks. Encoding device 104 may partition a superblock and other coding blocks into smaller blocks using square or non-square partitioning. Non-square blocks may include N/2×N, N×N/2, N/4×N, and N×N/4 blocks. Encoding device 104 and decoding device 112 may perform separate prediction and transform processes on each of the coding blocks.

AV1 also defines a tile of video data. A tile is a rectangular array of superblocks that may be coded independently of other tiles. That is, encoding device 104 and decoding device 112 may encode and decode, respectively, coding blocks within a tile without using video data from other tiles. However, encoding device 104 and decoding device 112 may perform filtering across tile boundaries. Tiles may be uniform or non-uniform in size. Tile-based coding may enables parallel processing and/or multi-threading for encoder and decoder implementations.

In some examples, the encoding device 104 and decoding device 112 can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The encoding device 104 and decoding device 112 can be configured to use quadtree partitioning per HEVC, QTBT partitioning, MTT partitioning, or other partitioning structures.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

| Specification of intra-prediction mode and associated names | |
| --- | --- |
| Intra-prediction mode | Associated name |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector $(\Delta x, \Delta y)$, with $\Delta x$ specifying the horizontal displacement and $\Delta y$ specifying the vertical displacement of the reference block relative to the position of the current block. In some cases, a motion vector $(\Delta x, \Delta y)$ can be in integer sample accuracy (also referred to as integer accuracy), in which case the motion vector points to the integer-pel grid (or integer-pixel sampling grid) of the reference frame. In some cases, a motion vector $(\Delta x, \Delta y)$ can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., $\frac{1}{4}$-pixel, $\frac{1}{2}$-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters $(\Delta x_0, y_0, refIdx_0$ and $\Delta x_1, y_1, refIdx_1)$ are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters $(\Delta x_0, y_0, refIdx_0)$ is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector $(\Delta x)$, a vertical component of the motion vector $(\Delta y)$, a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communication link 120 to the decoding device 112 of the receiving device. The input 114 of the decoding device 112 may receive the NAL units. The communication link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi', radio frequency (RF), UWB, WiFi-Direct, cellular, Long-Term Evolution (LTE), WiMax', or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in a storage 108. The output 110 may retrieve the encoded video bitstream data from the encoder engine 106 or from the storage 108. The storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection, and may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to the storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may rescale and perform an inverse transform on the encoded video bitstream data. Residual data is passed to a prediction stage of the decoder engine 116. The decoder engine 116 predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 11. An example of specific details of the decoding device 112 is described below with reference to FIG. 12.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. In some examples, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As described above, for each block, a set of motion information (also referred to herein as motion parameters) can be available. A set of motion information can contain motion information for forward and backward prediction directions. Here, forward and backward prediction directions are two prediction directions of a bi-directional prediction mode and the terms "forward" and "backward" do not necessarily have a geometry meaning. Instead, forward and backward can correspond to a reference picture list 0 (RefPicList0) and a reference picture list 1 (RefPicList1) of a current picture, slice, or block. In some examples, when only one reference picture list is available for a picture, slice, or block, only RefPicList0 is available and the motion information of each block of a slice is always forward. In some examples, RefPicList0 includes reference pictures that precede a current picture in time, and RefPicList1 includes reference pictures that follow the current picture in time. In some cases, a motion vector together with an associated reference index can be used in decoding processes. Such a motion vector with the associated reference index is denoted as a uni-predictive set of motion information.

For each prediction direction, the motion information can contain a reference index and a motion vector. In some cases, for simplicity, a motion vector can have associated information, from which it can be assumed a way that the motion vector has an associated reference index. A reference index can be used to identify a reference picture in the current reference picture list (RefPicList0 or RefPicList1). A motion vector can have a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, within one coded video sequence two pictures with the same POC value does not occur often. When multiple coded video sequences are present in a bitstream, pictures with a same POC value may be closer to each other in terms of decoding order. POC values of pictures can be used for reference picture list construction, derivation of reference picture set as in HEVC, and/or motion vector scaling, among other things.

As described above, video encoders may encode video based on blocks of varying sizes. A video encoder may encode the blocks using inter-prediction that allows for temporal coding across pictures, or use intra-prediction that allows for coding blocks within a picture. The cumulative effect of the coding is to approximate the original video within the block. As blocks may be coded relatively independently, the approximations across different blocks may not completely align from one block to the next, possibly resulting in discontinuities at or around block edges. To help reduce the appearance of such discontinuities, in-loop filters (also referred to as "loop filters" or "filters" herein) may be applied to the video data (e.g., after prediction is performed). As an example, in HEVC, deblocking and sample adaptive offset (SAO) filters are used to help reduce the appearance of ringing artifacts and intensity changes. In HEVC, the blocking filter and SAO filter are applied sequentially with output of the blocking filter being input to the SAO filter. In some cases, multiple filters may be applied in parallel or in series to help enhance performance.

In the Enhanced compression model (ECM 2.0), three filters—including an SAO filter, a Cross Component SAO (CCSAO) filter, and a Bilateral Filter (BIF)—operate in parallel. For example, the SAO filter, the BIF, and the CCSAO filter take the deblocked samples as input and provide output offsets. The output offsets of all three filters are added to the input samples and jointly clipped based on the bitdepth. These clipped output samples are provided to an Adaptive loop filter (ALF) as input samples.

The current version of the CCSAO filter in ECM-2.0 uses the band offset where a given sample classified into a band by leveraging the correlation between different components (e.g., Luma/chroma). To further improve the compression/BD-rate (Bjontegaard rate) performance, a contribution AVS M6110 introduces an "edge offset" classifier for CCSAO. For instance, in the "edge offset" mode, a given sample is classified into a "class/band" by considering its edge information and the edge information of its collocated samples from the other components. Like the band offset, an offset is also generated for each of the class/band and then signaled in or with the bitstream. In addition to other improvements, the systems and techniques described herein improve the "edge offset" (EO) design of AVS M6110.

Figure 2:
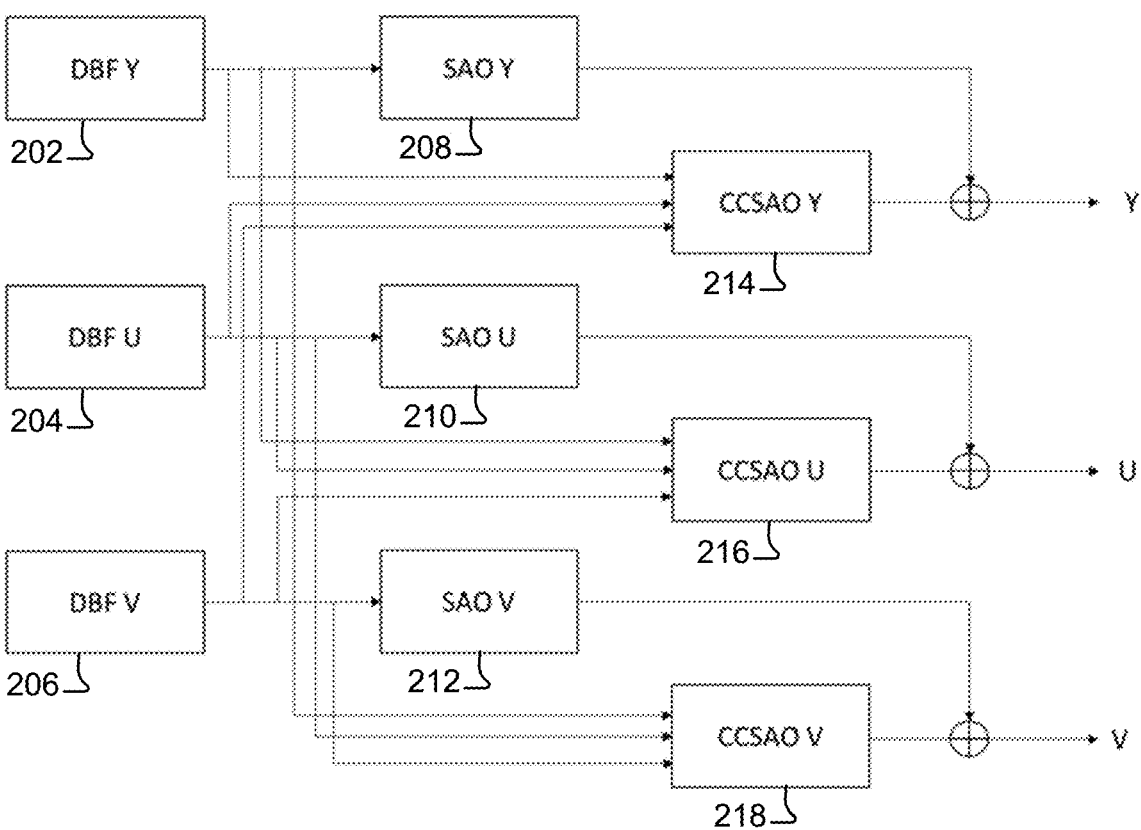
FIG. 2 is diagram illustrating an example of a decoding workflow when a cross component sample adaptive offset (CCSAO) filter is applied, in accordance with examples described herein.

Similar to SAO, a CCSAO filter classifies the reconstructed samples into different categories, properly derives one offset for each category, and adds the offset to the reconstructed samples in that category. However, in contrast to SAO which only uses one single luma or chroma component of current sample as input, the CCSAO utilizes three components (e.g., the luma sample, the chroma-blue sample, and the chroma-red sample) to classify the current sample or pixel into different categories. The luma component may represent the brightness while chroma represents color information of an image of the video. The CCSAO filter attempts to leverage correlations between the multiple components, as opposed to SAO, which may just filter on a single component. As seen in FIG. 2, an SAO Y filter 208 may receive input from a deblocking filter for band Y 202, an SAO U filter 210 may receive input from a deblocking filter for band U 204, and an SAO V filter 212 may receive input from a deblocking filter for band V. In contrast a CCSAO Y filter 214, CCSAO U filter 216, and CCSAO V filter 218 all receive input from deblocking filter for band Y 202, band U 204, and band Y 206. To facilitate parallel processing, the output samples from the de-blocking filter are used as the input of the CCSAO. FIG. 2 is diagram illustrating an example of a decoding workflow when a CCSAO is applied.

In the current CCSAO design, to achieve a better complexity-performance trade-off, only band offset (BO) is used to enhance the quality of the reconstructed samples. For a given luma or chroma sample, three candidate samples are selected to classify the given sample into different categories, such as one collocated luma Y sample, one collocated chroma U sample, and one collocated chroma V sample. The sample values of these three selected samples are then classified into three different bands, denoted as {band$_Y$, band$_U$, band$_V$}, and a joint index i is used to indicate the category of the given sample. One offset is signaled and added to the reconstructed samples that fall into that category, which can be formulated as follows in some examples:

$$\text{band}_Y = (Y_{col} \cdot N_Y) >> BD$$

$$\text{band}_U = (U_{col} \cdot N_U) >> BD$$

$$\text{band}_V = (V_{col} \cdot N_V) >> BD$$

$$i = \text{band}_Y \cdot (N_U \cdot N_V) + \text{band}_U \cdot N_V + \text{band}_V$$

$$C'_{rec} = \text{Clip1}(C_{rec} + \sigma_{CCSAO}[i]) \tag{1}$$

In Equation (1), {$Y_{col}$, $U_{col}$, $V_{col}$} are the three selected collocated samples that are used to classify the current sample; {$N_Y$, $N_U$, $N_V$} are the numbers of equally divided bands applied to {$Y_{col}$, $U_{col}$, $V_{col}$} full range respectively; BD is the internal coding bit-depth; $C_{rec}$ may be an input reconstructed from outputs of a deblocking filter for band Y 202, band U 204, and band Y 206 before CCSAO is applied; $C'_{rec}$ is the reconstructed samples after the CCSAO is applied; $\sigma_{CCSAO}[i]$ is the value of CCSAO offset that is applied to the i-th BO category. The CCSAO offset is based on the value i, which is derived based on the three components (e.g., band$_Y$, band$_U$, and band$_V$ in Equation (1)). Of note the collocated samples {$Y_{col}$, $U_{col}$, $V_{col}$} may be different from the current sample (e.g., the sample being processed by the filters). In the current design, the collocated luma sample can be chosen from 9 candidate positions, while the collocated chroma sample positions are fixed, as depicted in FIG. 3. In some cases, a value for $\sigma_{CCSAO}$ may be an implementation specific optimization value provided by a coding device (e.g., an encoding device, a decoding device, or a combined encoder-decoder). In some cases, the value for $\sigma_{CCSAO}$ may be determined based on a means squared distortion optimization for each component.

Similar to SAO, different classifiers can be applied to different local regions to further enhance picture quality (e.g., quality of the entire picture). The parameters for each classifier (e.g., the position of $Y_{col}$, $N_Y$, $N_U$, $N_V$, and offsets (e.g., value for $\sigma_{CCSAO}$)) can be signaled at the picture or frame level (or other signaling level, such as slice level, etc.). The classifier that is to be used can be explicitly signaled and switched at the block (e.g., CTB) level (or other signaling level). In some cases, for each classifier, the maximum of {$N_Y$, $N_U$, $N_V$} is set to {16, 4, 4}, and offsets are constrained to be within the range [−15, 15]. The maximum classifiers per frame may be constrained to be 4.

SAO filter attempts to reduce the undesirable visual artifacts, such as ringing artifacts, that could become more serious with large transforms and longer tap interpolation filters. For instance, an SAO filter attempts to reduce the mean distortion between original samples and reconstructed samples by first classifying reconstructed samples into different categories (e.g., based on the candidate positions and collocated samples), obtaining an offset for each category, and then adding the offset to each sample of the category without signaling the location of to-be-corrected samples.

An SAO filter may use different offsets on a sample-by-sample basis in a region, such as depending on the sample classification. SAO parameters can be adapted from region to region. Two SAO types that are used in ECM-2.0 are edge offset (EO) and band offset (BO). For EO, the sample classification is based on a comparison between current samples and neighboring samples. For BO, the sample classification is based on the sample values. In some cases, each color component may have its own SAO parameters. To achieve low encoding latency and to the reduce the buffer requirement (e.g., the amount of data stored in a buffer), the region size may be fixed to one block (e.g., one CTB). To reduce side information, multiple blocks (e.g., CTUs) can be merged together to share SAO parameters.

Figure 4:
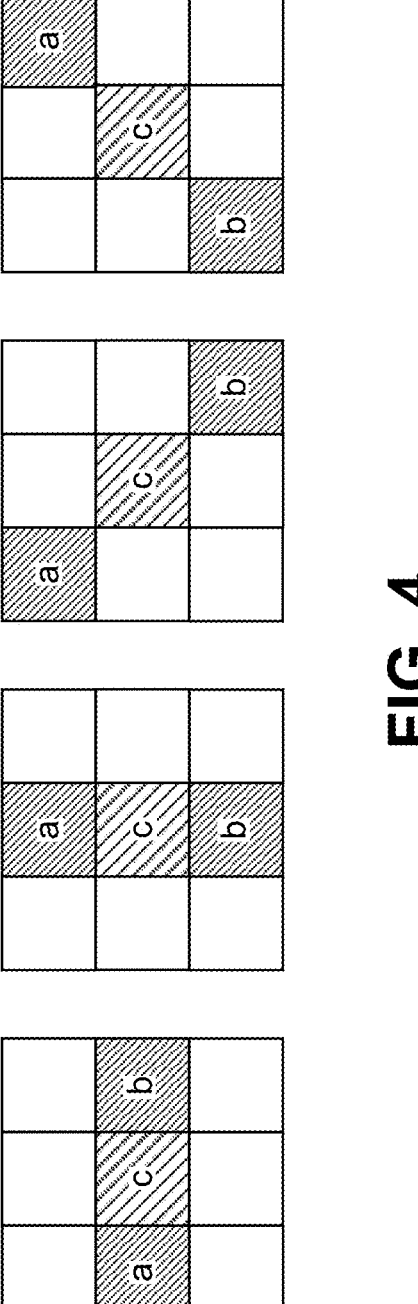
FIG. 4 is a diagram illustrating an example of four 1-D directional patterns for an edge offset (EO) Sample Adaptive offset (SAO) filter sample classification, including horizontal (EO class=0), vertical (EO class=1), 135° diagonal, and 45° diagonal, in accordance with examples described herein.

In some cases, an EO type of an SAO filter uses four 1-D directional patterns for sample classification, including horizontal (EO class=0), vertical (EO class=1), 135° diagonal, and 45° diagonal as shown in FIG. 4. The label "c" in FIG. 4 represents a current sample and the labels "a" and "b" represent two neighboring samples. According to the patterns illustrated in FIG. 4, four EO classes are specified, where an EO class corresponds to one pattern. In some cases, on the encoder side, only one EO class can be selected for each CTB that enables EO. Based on rate-distortion (RD) optimization, the best EO class (e.g., with the best RD performance) is sent in or with the bitstream (e.g., as side information). The EO type of SAO filter attempts to detect whether there is edge information in neighboring samples (e.g., a and b) and assign an offset correspondingly. Because the patterns are 1-D, the results of the classifier may not exactly correspond to extreme samples.

For a given EO class, each sample inside the block (e.g., inside the CTB) is classified into one of five categories. The current sample values labeled as "c" is compared with its two neighbors along the selected 1-D pattern. The classification rules for each sample are summarized in Table 1 below:

TABLE 1

| Specification of intra-prediction mode and associated names | |
| --- | --- |
| Intra-prediction mode | Associated name |
| 0 | INTRA_PLANAR |
| 1 | INTRA_DC |
| 2 . . . 34 | INTRA_ANGULAR2 . . . INTRA_ANGULAR34 |

Categories 1 and 4 illustrated in Table 1 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

In some cases, a BO type of an SAO filter implies one offset is added to all samples of the same band. In some examples, the sample value range is equally divided into 32 bands. For 8-bit samples ranging from 0 to 255, the width of a band is 8, and sample values from 8 k to 8K+7 belong to band k, where k ranges from 0 to 31. The average difference between the original samples and reconstructed samples in a band (referred to as the "offset" of a band) is signaled to the decoder. There is no constraint on offset signs. Only offsets of four consecutive bands and the starting band position are signaled to the decoder. In some cases, the BO type of SAO filter does not consider collocated and neighboring sample values.

As noted above, AVS M6110 introduces an "edge offset" (EO) classifier for CCSAO. The edge offset design proposed in AVS M6110 is only applied to the two-color components (chroma-blue (Cb) and chroma-red (Cr)), but not to the luma (Y) component. As mentioned above, different classifiers can be applied to different local regions of a picture to further enhance the entire picture quality. The parameters for each classifier/set (e.g., the position of $Y_{col}$, $N_Y$, $N_U$, $N_V$, and offsets) can be signaled at the frame level, and the classifier that is to be used can be explicitly signaled and switched at the block (e.g., CTB) level.

Figure 5:
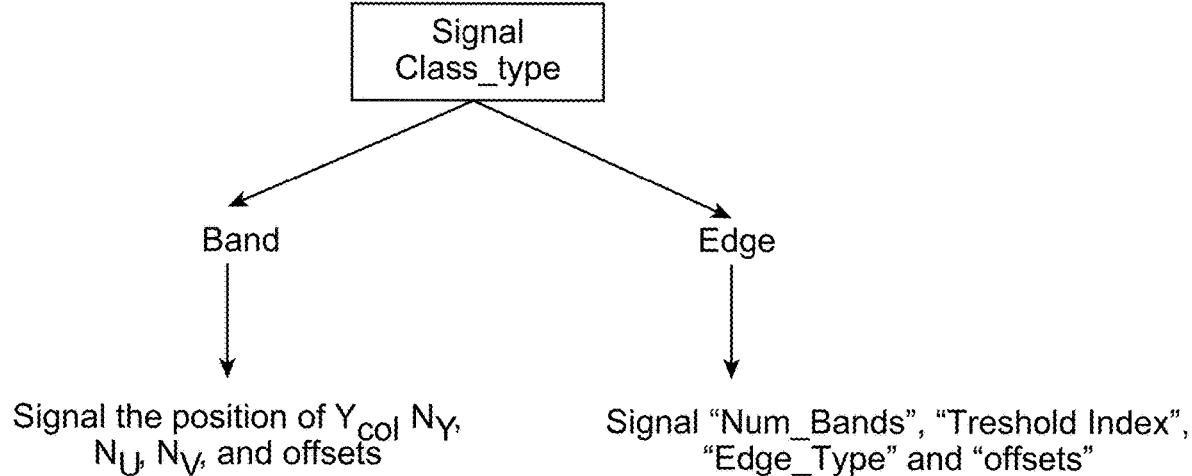
FIG. 5 is a diagram illustrating an example of information signaled/contained in each classifier/set associated with an edge based classification (e.g., CCSAO EO), in accordance with examples described herein.

With the introduction of CCSAO "Edge" based classification (CCSAO EO), each classifier/set is firstly distinguished by whether it uses "band" based classifier or "Edge" based classifier. A flag or a syntax element (e.g., "class_type") can be used to distinguish whether a classifier is "Band" or "Edge" based classification. An example of the information signaled in each class/set is as shown in FIG. 5.

Similar to the "SAO" edge-based classifier, the CCSAO edge based classifier (CCSAO EO) also uses the current sample (e.g., "c") and neighboring sample information (e.g., "a" and "b") to determine to which category the given sample belongs. The CCSAO EO classifier can also use the same 1-D directional patterns ("Edge_Type") as SAO edge offset (e.g., as shown in FIG. 4). Similar to SAO, the coding device (e.g., an encoding device, a decoding device, or a combined encoder-decoder) may decide the best 1-D directional pattern using the rate-distortion (RD) optimization and signal this additional information in each classifier.

For a given CCSAO EO 1-D pattern, each sample inside the CTB can be classified as follows:

In the first step, two variable pa and pb are computed as shown in the equation below:

$$pa=(a-c<0)?(a-c<(-Th)?0:1):(a-c<(Th)?2:3) \qquad (2)$$

$$pb=(b-c<0)?(b-c<(-Th)?0:1):(b-c<(Th)?2:3) \qquad (3)$$

where "a" and "b" are two neighbor samples of collocated luma sample "c". The variables "a" and "b" are chosen as per the 1-D pattern which is signaled using the "Edge_Type". The current chroma sample which is being processed is "d". The variable "Th" is a threshold which is signaled inside the classifier information (e.g., as shown in FIG. 5). In some cases, Equation (2) acts to check whether there is an edge in the image between sample c and sample a by checking that the difference between c and a is less than 0 (e.g., c is larger than a) and that this difference is greater than a threshold value and assigning pa a value between 0-3. Similarly, Equation (3) acts to check whether there is an edge in the image between sample c and sample b by checking that the difference between c and b is less than 0 (e.g., c is larger than b) and that this difference is greater than a threshold value and assigning pb a value between 0-3. A classification (e.g., class_idx) may then be determined.

The final class_idx is derived as follows:

$$class\_idx=band*16+pa*4+pb \qquad (4)$$

where the variable "band" is computed as follows:
The syntax element "Num bands" is parsed from the bitstream.

If the syntax element "Num bands" is less than a certain value (e.g., a value of 2), then the band is derived as follows:

$$band=(c*BandNum)>>bitDepth \qquad (5)$$

where the variable "c" used above is the collocated luma sample.

else if the syntax element "Num bands" is greater than the certain value (e.g., a value of 2), then the band is derived as follows:

$$band=(d*BandNum)>>bitDepth \qquad (6)$$

where the variable "d" used above is the current chroma sample which is being processed.

As noted above, systems and techniques are described herein for improving the CCSAO filter design (e.g., the CCSAO EO filter design).

In some aspects, the systems and techniques can perform a new band calculation to improve filter design (e.g., the CCSAO design). The CCSAO performed according to such systems and techniques can be referred to as edge offset (EO) CCSAO. In some cases, a band for a current sample may be determined based on either luma or chroma samples. A band can also be referred to herein as a classification (or class) or classification band (or classification band information). For instance, the variable "band" (e.g., in Equation (4) above where class_idx=band*16+pa*4+pb) can be derived as follows:

If the syntax element "Num bands" (e.g., obtained from the bitstream based on a means square distortion criteria) is less than a certain value (e.g., a value of 2 or 4 or other value in some cases), then the band is derived as follows:

$$band=(c*BandNum)>>bitDepth \qquad \text{(same as Eq. 5)}$$

where the variable "c" used above is the collocated luma sample (when the chroma component is processed) or a given or current luma sample (when the samples from luma component are processed, e.g., Y). In some cases, the Num bands syntax element may be provided on a per-frame basis. In some cases, the Num bands syntax element may be provided per CTU, slice, or for a frame in an adaptation parameter set which is then applicable for a set of frames. The variable BandNum may be determined based on a number of Num bands value range for a particular band.

else if the syntax element "Num bands" is greater than the certain value (e.g., a value of 2 or 4 or other value in some cases) and less than a second certain value (e.g., a value of 4 or 6 or other value in some cases), then the band is derived as follows:

$$band=(d*BandNum)>>bitDepth. \qquad \text{(same as Eq. 6)}$$

where the variable "d" used above is the current chroma sample (e.g., Cb) which is being processed. Else if the syntax element "Num bands" is greater than the second certain value (e.g., a value of 4 or 6 or other value in some cases) and less than the total "Num bands" (e.g., 8 or other value in some cases), then the band is derived as follows:

$$band=(e*BandNum)>>bitDepth \qquad (7)$$

where the variable "e" used in Equation (7) is the collocated chroma sample (e.g., Cr) from the other chroma plane.

For example, if the variable "d" (from Eq. 6) is the current chroma sample which is being processed and is belonging to the "Cb" component, then the variable "e" (in Eq. 7) is the collocated chroma sample present in the "Cr" component. In such an example, using Equation (7), the new band calculation used by the systems and techniques described herein uses the information from all the three components (Y, Cb, and Cr) to derive the basic "band" information. That is, the band information may be determined based on the luma (Y), the chroma-red (Cr), and/or the chroma-blue (Cb).

Figure 6:
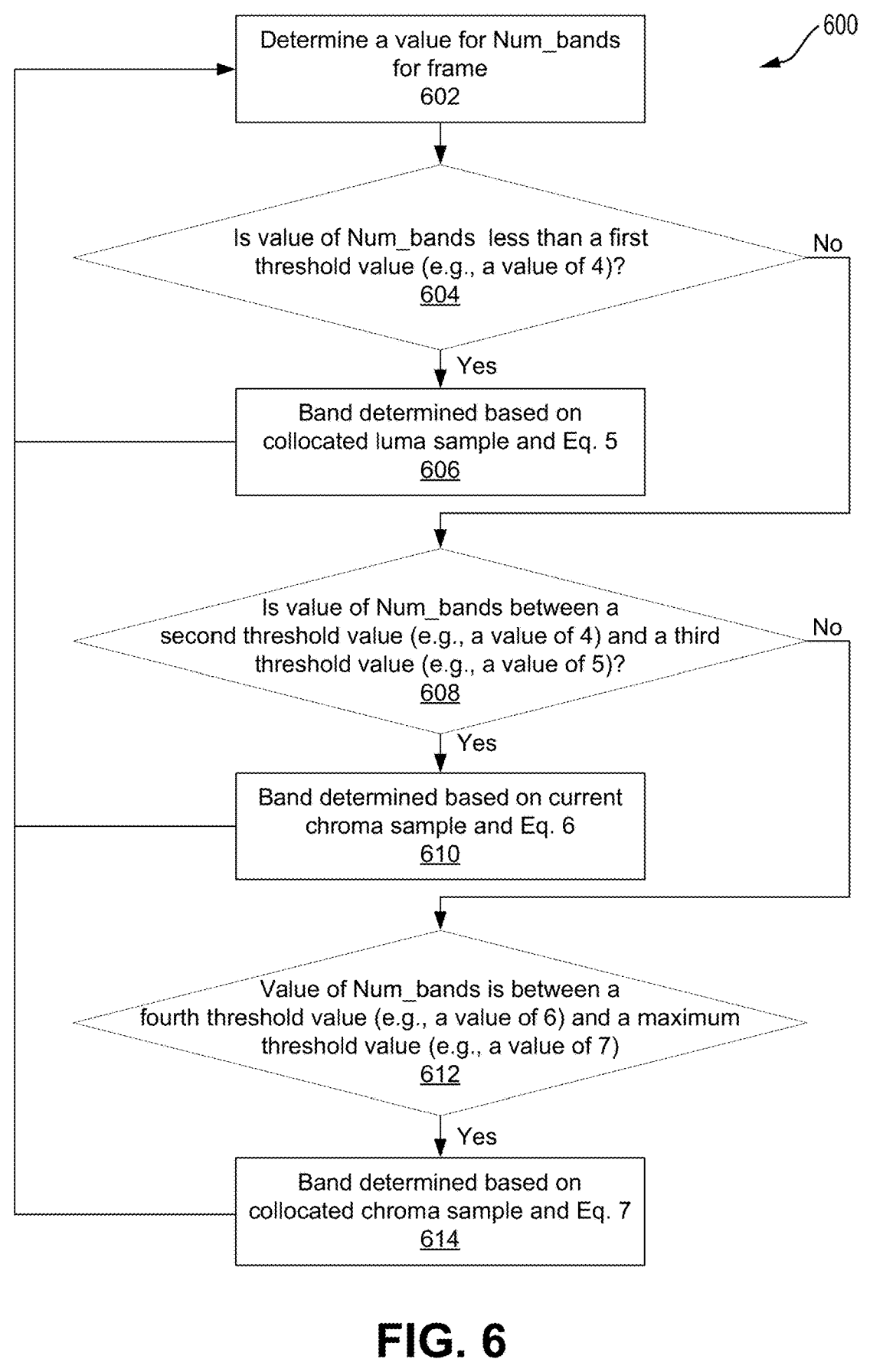

FIG. 6 is a flow diagram illustrating an example edge classification process 600, in accordance with aspects of the present disclosure. In this example, a band number syntax element defining a number of available classification bands (which may be denoted as Num bands) may have a defined maximum value of 8 and can have values ranging from 0 . . . 7. A Num bands variable value, such as variable BandNum, can have any value within the Num bands value range. For a given frame, a coding device (e.g., an encoding device, a decoding device, or a combined encoder-decoder) may determine, for example based on a means square distortion criteria or other criteria or metric for the frame, a value for Num bands at block 602. If, at block 604, the process 600 determines that the value of Num bands is less than a first threshold value (e.g., a value of 4), the classification band for the sample may be determined, at block 606, based on a collocated luma sample, "c" (e.g., Y), which is multiplied by a band number variable (which may be denoted as BandNum or other variable) and then right shifted two places (e.g., per Eq. 5 as shown above). A value for BandNum may be determined based on the Num bands value range for this band. In the example above using a first threshold value of 4 and the process 600 determining the value of Num bands is less than the threshold value of 4 (the value of Num bands is less than 4, denoted as 0 . . . 3), the process 600 can determine the value for BandNum as 3 at block 606. The effect of applying Eq. 5 in this example is to split the band into four sub-bands and assign the collocated luma sample to one of those sub-bands. Execution may then proceed to the next frame at block 602.

At block 604, if the value of Num bands is not less than 4 (e.g., is greater than or equal to 4), the process 600 may proceed to block 608. At block 608, if the value of Num bands is between second and third thresholds (e.g., a second threshold of 4 and a third threshold of 5), the classification band for the sample may be determined, at block 610, based on a current chroma sample, "d" (e.g., chroma blue, Cb) which is multiplied by the variable BandNum and then right shifted two places (e.g., per Eq. 6 as shown above). Based on the second and third threshold values of 4 and 5, respectively, the value for BandNum for this band is 2 (e.g., the number of values for Num bands values 4 and 5). The effect of Eq. 6 in this example is to split the band into two sub-bands and assign the current chroma sample to one of those sub-bands. Execution may then proceed to the next frame at block 602.

At block 608, if the value of Num bands is not between than the second and third threshold values, the process 600 may proceed to block 612. At block 612, if the value of Num bands is between a fourth threshold value (e.g., a value of 6) and a maximum threshold value of Num bands (e.g., a value of 7), the classification band for the sample may be determined, at block 614, based on a collocated chroma sample, "e" (e.g., chroma red, Cr), which is multiplied by the variable BandNum and then right shifted two places (e.g., per Eq. 7 as shown above). Based on the fourth and maximum threshold values of 6 and 7, respectively, the value for BandNum for this band is also 2 (e.g., the number of values for Num bands values 6 and 7). The effect of Eq.

7 in this example is to split the band into two sub-bands and assign the collocated chroma sample to one of those sub-bands. Execution may then proceed to the next frame at block 602.

In some cases, the coding device may also store the means square distortion criteria associated with the determination of the Num bands value and how the determined Num bands correlate with the band/sub-band values. The stored means square distortion criteria may be indicated for a decoder for decoding.

Unlike the M6110 design, the CCSAO edge offset (EO) design according to aspects described herein can also be applied to the luma component. In one illustrative example, the total number of bands allowed are 8, and a 3-bit fixed length code can be used to signal the total number of bands. If the band value is between 0 and 3 or 1 to 4, then the current luma sample (when the luma component is processed) or the collocated luma sample (when the chroma component is processed) is used in the band derivation.

FIG. 7 is a diagram illustrating an example of samples used in deriving the band information for the combined edge/band based classifier. As shown, of the luma samples numbered 1 to 8, the luma sample 702 (numbered with a 4) is the collocated luma sample for the chroma U sample 704 (numbered with a 4) and for the chroma V sample 706 (also numbered with a 4).

In some examples, when the luma samples are being processed, for the given or current sample, either the same given sample (in the example of FIG. 7, the luma sample 702 numbered with a 4) can directly be used in deriving the "band" information and/or in some cases the other samples numbered 0 to 8 can also be used in deriving the "band" information. In some cases, the encoding device 104 can use a rate-distortion (RD) based optimization to decide which of the samples from 0 to 8 is the best sample in deriving the "band" information. The encoding device 104 can signal it in the bitstream. In some cases, the collocated chroma U sample (e.g., the chroma U sample 704 numbered with a 4) can be used in deriving the "band" information and/or the collocated chroma V sample (e.g., the chroma V sample 706 numbered with a 4) be used in deriving the "band" information.

In some aspects, when chroma "U" samples are being processed, for the given sample (e.g., the current sample being encoded or decoded), the same given chroma sample (e.g., the chroma U sample 704 numbered with a 4) can be used in deriving the "band" information or the collocated luma samples numbered 0 to 8 can be used in deriving the "band" information or the Collocated V (e.g., the chroma V sample 706 numbered with a 4) can be used in deriving the "band" information, or a combination thereof.

In some aspects, when chroma "V" samples are being processed, for the given sample, either the same given chroma sample (e.g., the chroma V sample 706 numbered with a 4) can be used in deriving the "band" information o) the collocated luma samples numbered 0 to 8 can be used in deriving the "band" information or the Collocated U (e.g., the chroma U sample 704 numbered with a 4) can be used in deriving the "band" information, or a combination thereof.

Further, in some examples, the band information can be derived as shown in Equation (8) below. According to Equation (8), the process of deriving the band information uses all the three components (similar to the band offset of CCSAO) and then additionally also uses the edge information (pa and pb).

$$band_Y=(Y_{col}\cdot N_Y)>>BD$$

$$band_U=(U_{col}\cdot N_U)>>BD$$

$$band_V=(V_{col}\cdot N_V)>>BD$$

$$band=((band_Y\cdot(N_U\cdot N_V)+band_U\cdot N_V+band_V)*16)+pa*4+pb$$

$$Band=f(pa,pb,((band_Y\cdot(N_U\cdot N_V)+band_U\cdot N_V+band_V)*16)$$

$$f\rightarrow if\ pa==0\ and\ pb==0\ and\ x==0,\ then\ band=0$$

$$C'_{rec}=Clip1(C_{rec}+\sigma_{CCSAO}[i]) \quad (8)$$

Writing Equation (8) more generally, the band information may be derived as:

$$band_Y=(Y_{col}\cdot N_Y)>>BD$$

$$band_U=(U_{col}\cdot N_U)>>BD$$

$$band_Y=(V_{col}\cdot N_Y)>>BD$$

$$band=((band_Y\cdot(N_U\cdot N_Y)+band_U\cdot N_V+band_V)*N_A*N_B)+pa*N_B+pb$$

$$C'_{rec}-Clip1(C_{rec}+\sigma_{CCSAO}[i])$$

where $N_A$ is the number of possible values of pa and $N_B$ is the number of possible values of pb.

In some aspects, a change in a classification calculation (e.g., class_idx) is provided to improve filter design (e.g., the CCSAO design). For instance, instead of "using" any band related information in the "class_idx" calculation, only the "edge" information is used to determine the classification (e.g., without using any classification band information), such as the "class_idx" calculation. The "edge" information can be derived from either the collocated luma, current chroma or the collocated chroma components.

For example, the "class_idx" can be derived as follows:

$$class\_idx=pa*16+pb*4+pc*2+pd. \quad (9)$$

Here pa and pb can be derived similarly as shown in Equations (2) and (3) above.

Writing Equation (9) more generally, class_idx may be derived as:

$$class\_idx=pa*N_b*N_c*N_d+pb*N_c*N_d+pc*N_d+pd, $$

where $N_A$ is the number of possible values of pa, $N_B$ is the number of possible values of pb, $N_C$ is the number of possible values of pc, and $N_D$ is the number of possible values of pd.

In some cases, "pc" and "pd" give the "edge" information from the neighboring chroma samples of the current chroma sample which is being processed. In some cases, "pc" and "pd" may also be derived by using the "edge" information from the collocated chroma samples. In one illustrative example, "pc" and "pd" may be derived as follows:

$$pc=((f-d<(-Th)\|f-d<(Th))?0:1) \quad (10)$$

$$pd=((g-d<(-Th)\|g-d<(Th))?0:1) \quad (11)$$

where "d" is the current chroma sample which is being processed and "f" and "g" are the neighboring chroma samples of "d" in the given 1-D directional pattern.

In some examples, "pc" and "pd" can also be derived from the collocated chroma as follows.

$$pc=((h-e<(Th)\|h-e<(Th))?0:1) \quad (12)$$

$$pd=((i-e<(Th)\|i-e<(Th))?0:1) \quad (13)$$

where "e" is the collocated chroma sample of "d" and "i" and "e" are the neighboring chroma samples of "e" in the given 1-D directional pattern.

In some examples, the above-described CCSAO EO classifier may not be limited to the four 1-D patterns shown in FIG. 4. For instance, in some examples, the classification may use 2-D patterns; in one illustrative example, all of the 8 immediate neighbors of sample "c" in the 3×3 window can be used to derive the classification. For instance, a sobel operator can be used to derive the "gradient" information, which is then further used to classify the given sample In some aspects, an improved threshold selection technique is provided to improve filter design (e.g., the CCSAO design). For instance, as noted above, the AVS M6110 edge offset design uses fixed "thresholds". The encoding device 104 can select one among the "threshold" values based on rate-distortion optimization and is signaled in the set/classifier information. In some examples, the threshold values can be selected (and in some cases, should be selected) in such a way that the "extreme" samples in a given block (e.g., CTB), region, picture, or other video data should not pollute the bands or classifiers where the "average" value of all the samples in the given block (e.g., CTB), region, picture, etc. belong to.

According to aspects described herein, the systems and techniques can store an array of threshold values, and an index into one of the threshold arrays is chosen based on the "sequence resolution" (e.g. resolution of the video sequence), "quantization step", "slice quantization parameter", intra/inter mode, temporal layer ID, any combination thereof, and/or any other quantization parameter related information.

In one illustrative example, 16 different threshold values can be used. In some cases, the 16 threshold values can be selected based on the signal statistics of different video sequences. One observation that can be made is that the sample differences in low resolution sequences are larger than that of high-resolution sequences, in which case inclusion of a threshold value which allows for a better classification may need to be selected. In one illustrative example, a set of threshold values than can be chosen are as follows: {2,4,6,8,10,14,18,22,30,38,54,70,86,118,150,182}

The selected values are monotonically increasing and are statically selected based on sample differences from different video sequences (e.g., other video data) with different resolutions and signal statistics. For example, in Class F screen content sequences, the signal is constantly varying and has sharper edges resulting in larger pixel differences. In such scenarios, a threshold value which is larger (e.g. value of 70 or other value) can be a good threshold.

In some cases, threshold values may be selected from the set of threshold values. As an illustrative example for sequence resolution, for a small resolution sequence (e.g., lower resolution video), a number of threshold values selected from the set of threshold values may be relatively few (e.g., 1 threshold value, 2 threshold values, 3 threshold values, etc.) and the threshold values selected from the set of threshold values may be relatively high threshold values (e.g., a value of 25, 35, 50, etc.) as pixel values may be rapidly changing from pixel to pixel for smaller resolution sequences. Conversely, for a higher resolution sequence (e.g., HD/4K), pixel to pixel differences may be larger and relatively smaller threshold values (e.g., 10, 20, etc.) may be selected from the set of threshold values. Similarly, for quantization step, relatively higher quantization steps may be associated with different threshold values selected from the set of threshold values as compared to relatively lower quantization steps.

In some cases, the encoding device 104 can signal an index into the multi-valued (array) of threshold value based on rate-distortion optimization or any other criteria (e.g., based on the content). In one example, for screen content sequences, the encoding device 104 may choose an index into the threshold array which correspond to larger threshold values.

In some examples, instead of using "fixed" thresholds, the encoding device 104 can additionally or alternatively signal the threshold values per "slice" by performing a clustering of the samples (e.g., all of the samples). For instance, K-means clustering or other clustering approaches can be used. Once clustering is performed, the threshold value can be determined as the radius, the outermost value, or other characteristic of each of the K-clusters. To reduce signaling overhead, the threshold values can be further quantized before signaling.

Figure 8:
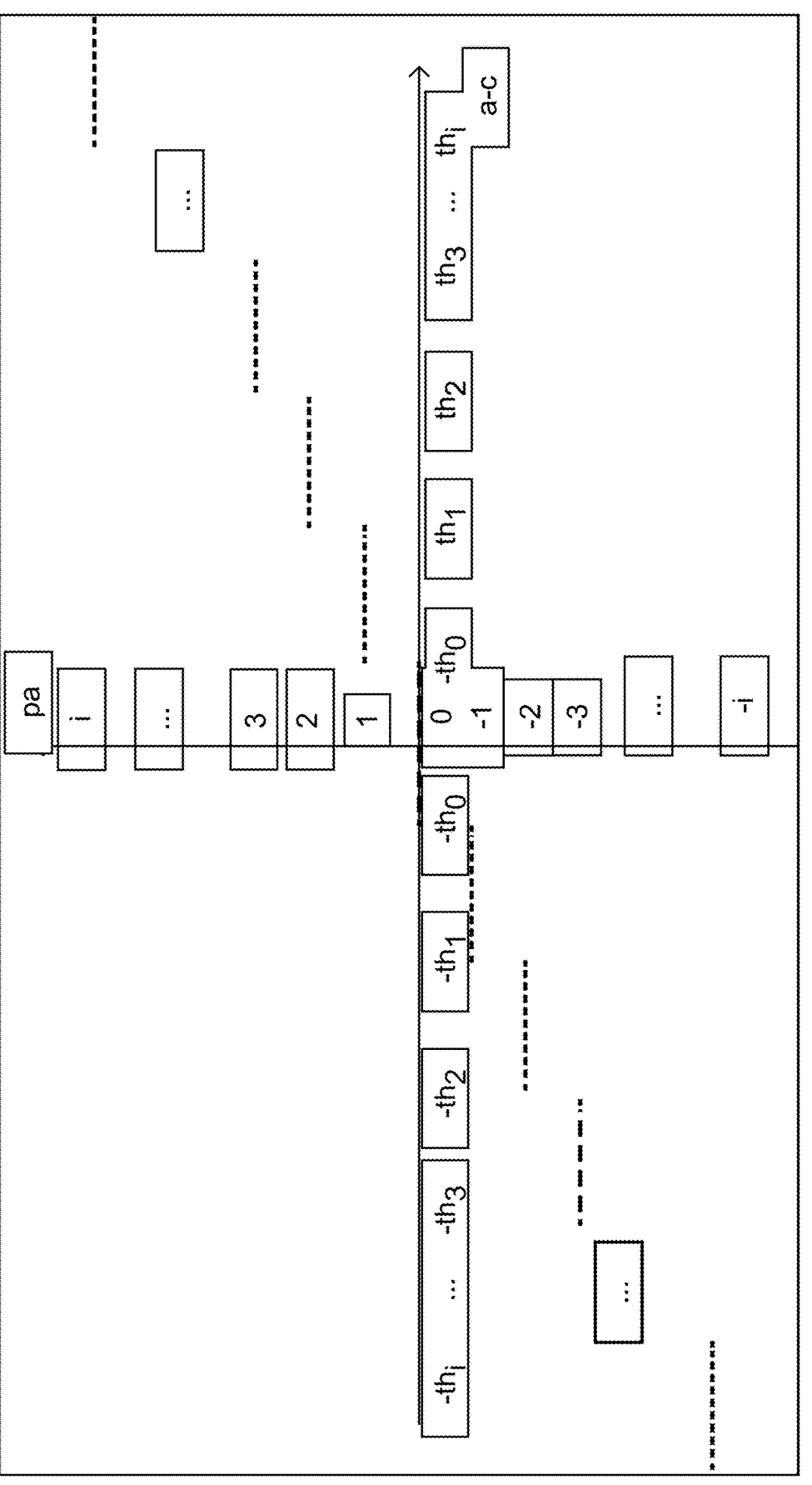
FIG. 8 is a diagram illustrating an example of deriving a variable pa using multiple thresholds, in accordance with examples described herein.

In some examples, multiple thresholds can be used to classify a given sample into a class_idx/band. For instance, as shown in FIG. 8, to derive pa, multiple thresholds are applied to a–c. As seen in FIG. 8, if a–c is between th0 and th1, then the value pa is assigned value 1. If a–c value is between th2 and th1, then pa is assigned value 2 and so on. Thus, classifications may be derived by comparing the sample difference a–c with multiple thresholds.

In some aspects, the systems and techniques described herein can include signaling of a set index syntax element (which may be denoted as set_idx) at a block (e.g., CTB, CU, etc.) level. For instance, in the CCSAO band offset design, the "set_idx" can be signaled as follows:

First an On/Off flag is signaled which is context coded. Context information is derived based on the neighboring left and top CTU neighbors.

If the flag is "On" then further the "set_idx" is signaled using truncated unary coding and all the bins are bypass coded.

In some examples, the systems and techniques described herein can additionally or alternatively context cod the bins from truncated unary coding. For instance, the context information can be predicted or derived from neighboring left and top CTU neighbors, or the context can be an empty context but a different one for each of the bins.

In some examples, the signaling of set_idx is changed to fixed length coding. In one illustrative example, if a maximum of 4 sets are possible, then a fixed length code of 2 bits can be used.

In some aspects, the systems and techniques described herein can include optimizing the joint class/set information for all components (e.g., the Y, Cb, and Cr components). For instance, in the CCSAO band/edge offset design, the "classifier" information is optimized for each of the components separately. Therefore, the "classifier" information contains offsets for each of the components separately resulting in additional signaling overhead. In some examples, the systems and techniques described herein can jointly optimize the "classifier" information for all the components. In one illustrative example, the optimization function can derive the best rate-distortion (RD) optimization cost considering both the Cb and Cr components, which can then reduce the signaling overhead.

In some aspects, the systems and techniques described herein can apply a constraint on the number of bands (classification bands) of band-based CCSAO. For instance, from Equation (1), the max value of $N_Y*N_V*N_U$ may be constrained, which is denoted as $N_{Max} \cdot N_V$, and $N_U$ may be signaled first, then $N_Y$ may be signaled/parsed based on $N_{Max}/(N_U*N_V)$. In one illustrative example, the number of bits of $N_Y$ may be derived as $\text{ceil}\{\log 2[\text{ceil}(N_{Max}/(N_U*N_V))]\}$, where ceil is the function that returns the smallest integer number that is greater or equal to its input.

In some cases, the systems and techniques may additionally or alternatively constrain that $N_Y$ shall not smaller than $N_V$ or $N_U$. $N_V$ and $N_U$ may be signaled/parsed first, then a delta_$N_Y$ may be signaled/parsed, such that $N_Y$=max $(N_U,N_V)$+delta_$N_Y$.

In some aspects, the systems and techniques described herein can perform a modification of the normal sample-adaptive offset (SAO) edge classification process. For example, the edge-based classifier of SAO classification can further be extended by comparing the sample differences with a threshold. For example, Table 1 above can be extended as follows in some cases:

In the first step,

Similar to the CCSAO process the threshold values can be used to derive an initial classification $$pa=(a-c<0)?(a-c<(-Th)?0:1):(a-c<(Th)?2:3) \tag{1}$$

$$pb=(b-c<0)?(b-c<(-Th)?0:1):(b-c<(Th)?2:3) \tag{2}$$

After Pa and Pb are derived, the sample classification in Table 1 above can be mixed with the values of Pa and Pb to derive several combinations resulting in different classifications. Therefore, in one illustrative example when Pa and Pb can take 4 different values, 16 different combinations/classes can be derived. When mixed with Table 1, which has 5 different categories/values, then a total of 5*16=80 different combinations can be possible.

That above classification is an illustrative example for explanatory purposes. Using such techniques in general, a system can not only use the SAO edge classification of comparing the sample values with each other, but can also additionally compare the sample differences with a given threshold value. The threshold value derivation can be similar to the improved threshold selection technique described above.

In some aspects, the systems and techniques described herein can provide a mixed band/edge classifier for sample-adaptive offset. For example, the SAO process currently either uses either edge offset or band offset, as previously explained. The mixed band/edge classifier can include a new classification methodology which uses a combination of both edge and Band. In some cases, the edge and band derivation can be done in a similar manner as the new band calculation and/or the improved threshold selection technique described above, with one difference being that the "edge" information and "band" information can only use the samples from the same component (e.g., luma or chroma) which is currently being processed. In such cases, no cross-component sample values can be used in classification, class_idx=band*16+pa*4+pb.

Here, Pa, Pb, and band value derivation can only use the samples which belong to the component which is currently being processed. For example, when luma samples are being processed, the same edge classifier process of SAO can be mixed with band classifier process of the luma component to further enhance the classification process. In another example, when chroma samples are being processed, the same edge classifier process of chroma SAO can be mixed with a band classifier process of the chroma component to further enhance the classification process.

FIG. 9 is a flow diagram illustrating a process 900 for processing video data. The process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. In some cases, the computing device may be or may include coding device, such as the encoding device 104, the decoding device 112, or a combined encoding device (or codec). The operations of the process 900 may be implemented as software components that are executed and run on one or more processors.

At block 902, the process 900 may include obtaining video data, such as block of video data including a number of samples. At block 904, the computing device (or component thereof) may determine a classification band for a first sample of the video data using at least chroma information from the first sample, collocated luma information, and collocated chroma information. In some cases, the chroma information includes first chroma component information, and the collocated chroma information includes second chroma component information that is different from the first chroma component information. In some examples, the sample is obtained from a position in a first picture of the video data, and the collocated luma information and the collocated chroma information are obtained from a corresponding position of a second picture of the video data. In some cases, the collocated luma information includes luma information of a second sample that is collocated with the first sample or luma information of one or more samples neighboring the second sample, and the collocated chroma information includes chroma information of a third sample that is collocated with the first sample. Referring to FIG. 7 as an illustrative example, the at least chroma information from the first sample may include the chroma U sample 704 (the current chroma sample being processed), the collocated luma information can be the luma information of the luma sample 702, and the collocated chroma information can be the chroma information of the collocated chroma V sample 706. In another illustrative example referring to FIG. 7, the at least chroma information from the first sample may include the chroma V sample 707 (the current chroma sample being processed), the collocated luma information can be the luma information of the luma sample 702, and the collocated chroma information can be the chroma information of the collocated chroma U sample 704.

In some cases, the computing device (or component thereof) may use edge information to determine the classification band for the first sample of the video data. The edge information may include information from a set of neighboring samples neighboring the first sample. For instance, as described herein, the edge information may be based on a difference between the first sample and a neighboring sample from the set of neighboring samples.

In some cases, the computing device (or component thereof) may determine the classification band from among a plurality of available classification bands. In some cases, the computing device (or component thereof) may determine the classification band based on the collocated chroma information based on the number of available classification bands being greater than a threshold value. In one illustrative example, the threshold value is a value of four, but can include other values in other examples.

At block 906, the computing device (or component thereof) may filter at least the first sample of the video data based on the classification band, such as using an in-loop filter (e.g., a cross component sample adaptive offset (CCSAO) edge offset (EO) filter). In some examples, the computing device (or component thereof) may determine a classification for the first sample based on the classification band and may filter at least the first sample based on the classification.

FIG. 10 is a flow diagram illustrating a process 1000 for processing video data. The process 1000 may be performed by a computing device (or apparatus) or a component (e.g., a chipset, codec, etc.) of the computing device. The computing device may be a mobile device (e.g., a mobile phone), a network-connected wearable such as a watch, an XR device, a vehicle or component or system of a vehicle, or other type of computing device. In some cases, the computing device may be or may include coding device, such as the encoding device 104, the decoding device 112, or a combined encoding device (or codec). The operations of the process 1000 may be implemented as software components that are executed and run on one or more processors.

At block 1002, the computing device (or component thereof) may obtain video data. At block 1004, the computing device (or component thereof) may determine a signal statistic based on the video data. In some cases, the signal statistic is based on at least one of a sequence resolution, a quantization step, a slice quantization parameter, an intra-prediction mode or an inter-prediction mode, or a temporal layer identifier At block 1006, the computing device (or component thereof) may select a set of threshold values based on a value of the signal statistic. In some cases, the set of threshold values includes sixteen threshold values. In some cases, the threshold values of the set of threshold values are monotonically increasing. In some cases, threshold values of the set of threshold values are selected based on sample differences between the video data and other video data.

At block 1008, the computing device (or component thereof) may filter the video data based on the selected set of threshold values.

In some examples, the techniques or processes described herein may be performed by a computing device or an apparatus, such as the encoding device 104, the decoding device 112, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., the system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. The connection may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of the disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of the disclosure are performed by a video encoding device, the techniques may also be performed by a video encoder/decoder, typically referred to as a "CODEC." Moreover, the techniques of the disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in the disclosure may be applicable to video coding in general, and may be applied to wireless and/or wired applications. In each case, the captured, pre-captured, or computer-generated video may be encoded by the video encoder. The encoded video information may be output by an output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various examples of the application have been described.

Figure 11:
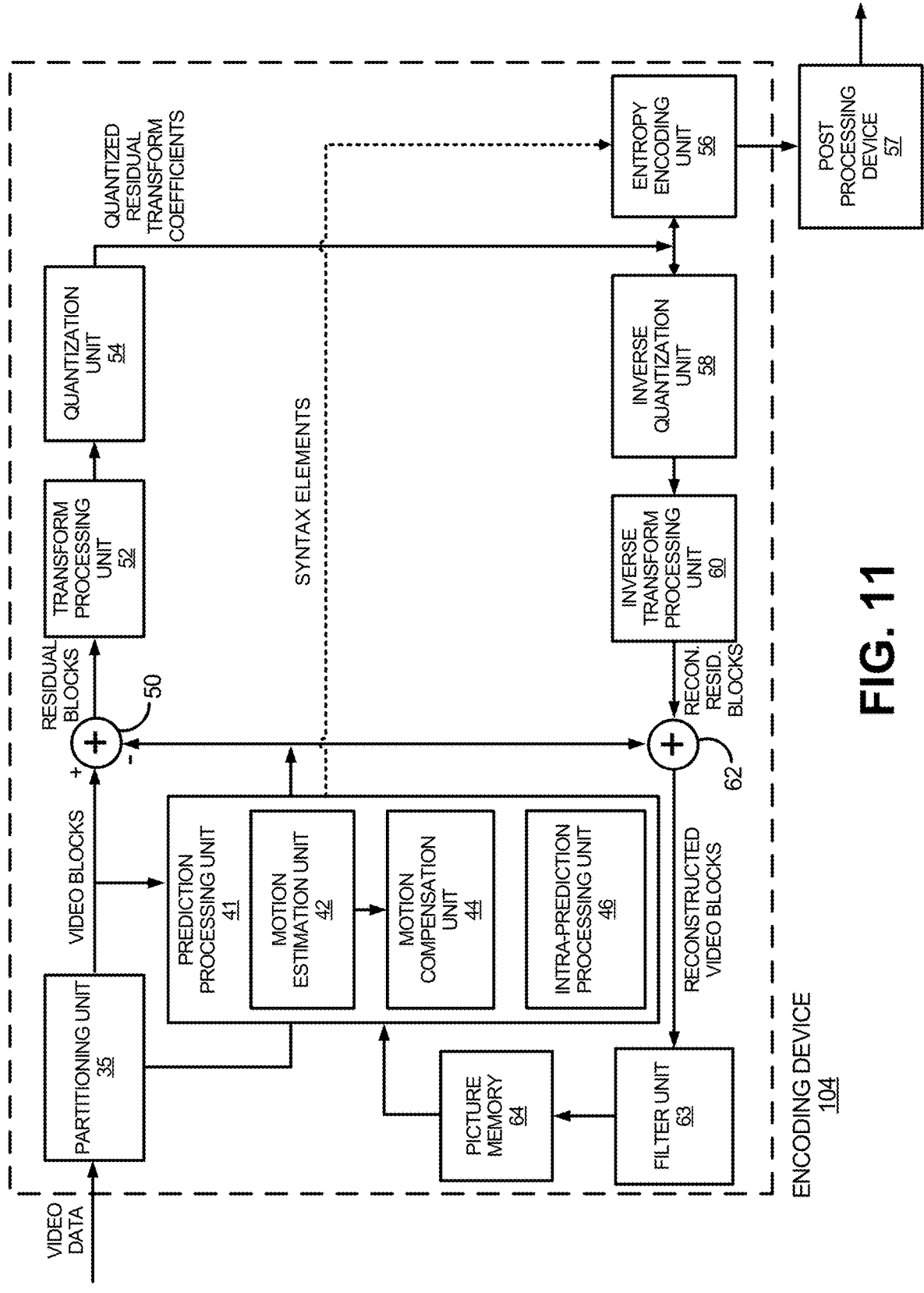
FIG. 11 is a block diagram illustrating a video encoding device, in accordance with some examples.
Figure 12:
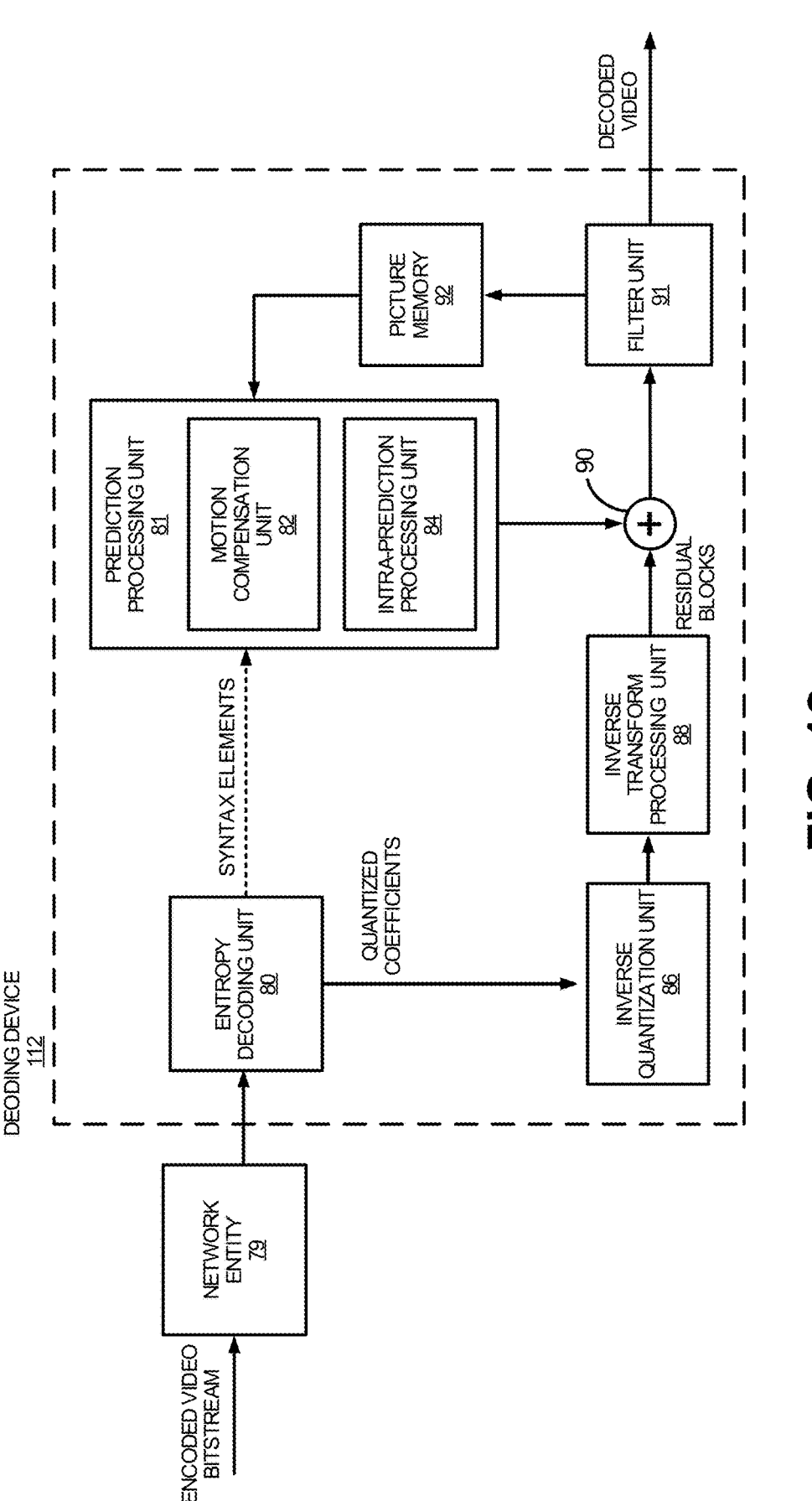
FIG. 12 is a block diagram illustrating a video decoding device, in accordance with some examples.

Specific details of the encoding device 104 and the decoding device 112 are shown in FIG. 10 and FIG. 11 respectively. FIG. 10 is a block diagram illustrating an example encoding device 104 that may implement one or more of the techniques described in the disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 10 as being an in loop filter, in other configurations, filter unit 63 may be implemented as a post loop filter. A post processing device 57 may perform additional processing on encoded video data generated by the encoding device 104. The techniques of the disclosure may in some instances be implemented by the encoding device 104. In other instances, however, one or more of the techniques of the disclosure may be implemented by post processing device 57.

As shown in FIG. 11, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform the subtraction operation.

Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts.

The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of the disclosure have generally been described with respect to the encoding device 104, but as mentioned above, some of the techniques of the disclosure may also be implemented by post processing device 57.

The encoding device 104 of FIG. 11 represents an example of a video encoder configured to perform one or more of the transform coding techniques described herein.

The encoding device 104 may perform any of the techniques described herein, including the processes described above with respect to FIG. 11.

FIG. 11 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 10.

During the decoding process, the decoding device 112 receives an encoded video bitstream that represents video blocks of an encoded video slice and associated syntax elements sent by the encoding device 104. In some examples, the decoding device 112 may receive the encoded video bitstream from the encoding device 104. In some examples, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in the disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In the above case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform the summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 11 as being an in loop filter, in other configurations, filter unit 91 may be implemented as a post loop filter. The decoded video blocks in a given frame or picture are stored in picture memory 92, which stores reference pictures used for subsequent motion compensation. Picture memory 92 also stores decoded video for later presentation on a display device, such as video destination device 122 shown in FIG. 1.

The decoding device 112 of FIG. 11 represents an example of a video decoder configured to perform one or more of the transform coding techniques described herein. The decoding device 112 may perform any of the techniques described herein, including the process 1900 described above with respect to FIG. 11.

In the foregoing description, aspects of the application are described with reference to specific examples thereof, but those skilled in the art will recognize that the subject matter of the application is not limited thereto. Thus, while illustrative examples of the application have been described in detail herein, it is to be understood that the concepts described herein may be otherwise variously embodied and employed, and that the appended claims are intended to be construed to include such variations, except as limited by the prior art. Various features and aspects of the above-described subject matter may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of the description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials.

The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in the disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for processing video data, the apparatus comprising: at least one memory; and at least one processor coupled to the at least one memory, the at least one processor being configured to: obtain video data; determine a classification band for a first sample of the video data using at least chroma information from the first sample, collocated luma information, and collocated chroma information; and filter at least the first sample of the video data based on the classification band.

Aspect 2. The apparatus of Aspect 1, wherein the at least one processor is further configured to use edge information to determine the classification band for the first sample of the video data, wherein the edge information comprises information from a set of neighboring samples neighboring the first sample.

Aspect 3. The apparatus of Aspect 2, wherein the edge information is based on a difference between the first sample and a neighboring sample from the set of neighboring samples.

Aspect 4. The apparatus of any of Aspects 1-3, wherein the at least one processor is further configured to: determine a classification for the first sample based on the classification band; and filter at least the first sample based on the classification.

Aspect 5. The apparatus of any of Aspects 1-4, wherein the chroma information comprises first chroma component information, and wherein the collocated chroma information comprises second chroma component information, the first chroma component information being different from the second chroma component information.

Aspect 6. The apparatus of any of Aspects 1-5, wherein the at least one processor is further configured to determine the classification band from among a plurality of available classification bands.

Aspect 7. The apparatus of Aspect 6, wherein the at least one processor is further configured to: determine the classification band based on the collocated chroma information based on a number of available classification bands being greater than a threshold value.

Aspect 8. The apparatus of Aspect 7, wherein the threshold value is a value of four.

Aspect 9. The apparatus of any of Aspects 1-8, wherein the sample is obtained from a position in a first picture of the video data, and wherein the collocated luma information and the collocated chroma information are obtained from a corresponding position of a second picture of the video data.

Aspect 10. The apparatus of any of Aspects 1-9, wherein the collocated luma information includes luma information of a second sample that is collocated with the first sample or luma information of one or more samples neighboring the second sample, and wherein the collocated chroma information includes chroma information of a third sample that is collocated with the first sample.

Aspect 11. A method for processing video data, the method comprising: obtaining video data; determining a classification band for a first sample of the video data using at least chroma information from the first sample, collocated luma information, and collocated chroma information; and filtering at least the first sample of the video data based on the classification band.

Aspect 12. The method of Aspect 11, further comprising using edge information to determine the classification band for the first sample of the video data, wherein the edge information comprises information from a set of neighboring samples neighboring the first sample.

Aspect 13. The method of Aspect 12, wherein the edge information is based on a difference between the first sample and a neighboring sample from the set of neighboring samples.

Aspect 14. The method of any of Aspects 11-13, further comprising: determining a classification for the first sample based on the classification band; and filtering at least the first sample based on the classification.

Aspect 15. The method of any of claims 11-14, wherein the chroma information comprises first chroma component information, and wherein the collocated chroma information comprises second chroma component information, the first chroma component information being different from the second chroma component information.

Aspect 16. The method of any of Aspects 11-15, further comprising determining the classification band from among a plurality of available classification bands.

Aspect 17. The method of Aspect 16, further comprising determining the classification band based on the collocated chroma information based on a number of available classification bands being greater than a threshold value.

Aspect 18. The method of Aspect 17, wherein the threshold value is a value of four.

Aspect 19. The method of any of Aspects 11-18, wherein the sample is obtained from a position in a first picture of the video data, and wherein the collocated luma information and the collocated chroma information are obtained from a corresponding position of a second picture of the video data.

Aspect 20. The method of any of Aspects 11-19, wherein the collocated luma information includes luma information of a second sample that is collocated with the first sample or luma information of one or more samples neighboring the second sample, and wherein the collocated chroma information includes chroma information of a third sample that is collocated with the first sample.

Aspect 21. A non-transitory computer-readable medium having stored thereon instructions that, when executed by at least one processor, cause the at least one processor to: obtain video data; determine a classification band for a first sample of the video data using at least chroma information from the first sample, collocated luma information, and collocated chroma information; and filter at least the first sample of the video data based on the classification band.

Aspect 22. The non-transitory computer-readable medium of Aspect 21, wherein the instructions further cause the at least one processor to use edge information to determine the classification band for the first sample of the video data, wherein the edge information comprises information from a set of neighboring samples neighboring the first sample.

Aspect 23. The non-transitory computer-readable medium of Aspect 22, wherein the edge information is based on a difference between the first sample and a neighboring sample from the set of neighboring samples.

Aspect 24. The non-transitory computer-readable medium of any of Aspects 21-23, wherein the instructions further cause the at least one processor to: determine a classification for the first sample based on the classification band; and filter at least the first sample based on the classification.

Aspect 25. The non-transitory computer-readable medium of any of Aspects 21-24, wherein the chroma information comprises first chroma component information, and wherein the collocated chroma information comprises second chroma component information, the first chroma component information being different from the second chroma component information.

Aspect 26. The non-transitory computer-readable medium of any of Aspects 21-25, wherein the instructions further cause the at least one processor to determine the classification band from among a plurality of available classification bands.

Aspect 27. The non-transitory computer-readable medium of Aspect 26, wherein the instructions further cause the at least one processor to determine the classification band based on the collocated chroma information based on a number of available classification bands being greater than a threshold value.

Aspect 28. The non-transitory computer-readable medium of Aspect 27, wherein the threshold value is a value of four.

Aspect 29. The non-transitory computer-readable medium of any of Aspects 21-28, wherein the sample is obtained from a position in a first picture of the video data, and wherein the collocated luma information and the collocated chroma information are obtained from a corresponding position of a second picture of the video data.

Aspect 30. The non-transitory computer-readable medium of any of Aspects 21-29,wherein the collocated luma information includes luma information of a second sample that is collocated with the first sample or luma information of one or more samples neighboring the second sample, and wherein the collocated chroma information includes chroma information of a third sample that is collocated with the first sample.

Aspect 31. An apparatus for processing video data, the apparatus comprising: at least one memory; and at least one processor coupled to the at least one memory, the at least one processor being configured to: obtain video data; determine a signal statistic based on the video data; select a set of threshold values based on a value of the signal statistic; and filter the video data based on the selected set of threshold values.

Aspect 32. The apparatus of Aspect 31, wherein the signal statistic is based on at least one of a sequence resolution, a quantization step, a slice quantization parameter, an intra-prediction mode or an inter-prediction mode, or a temporal layer identifier.

Aspect 33. The apparatus of any of Aspects 31-32, wherein the set of threshold values includes sixteen threshold values.

Aspect 34. The apparatus of any of Aspects 31-33, wherein threshold values of the set of threshold values are monotonically increasing.

Aspect 35. The apparatus of any of Aspects 31-34, wherein threshold values of the set of threshold values are selected based on sample differences between the video data and other video data.

Aspect 36. A method for processing video data, the method comprising: obtaining video data; determining a signal statistic based on the video data; selecting a set of threshold values based on a value of the signal statistic; and filtering the video data based on the selected set of threshold values.

Aspect 37. The method of Aspect 36, wherein the signal statistic is based on at least one of a sequence resolution, a quantization step, a slice quantization parameter, an intra-prediction mode or an inter-prediction mode, or a temporal layer identifier.

Aspect 38. The method of any of Aspects 36-37, wherein the set of threshold values includes sixteen threshold values.

Aspect 39. The method of any of Aspects 36-38, wherein threshold values of the set of threshold values are monotonically increasing.

Aspect 40. The method of any of Aspects 36-39, wherein threshold values of the set of threshold values are selected based on sample differences between the video data and other video data.

Aspect 41. A non-transitory computer-readable medium having stored thereon instructions that, when executed by one or more processors, cause the at one or more processors to: obtain video data; determine a signal statistic based on the video data; select a set of threshold values based on a value of the signal statistic; and filter the video data based on the selected set of threshold values.

Aspect 42. The non-transitory computer-readable medium of Aspect 41, wherein the signal statistic is based on at least one of a sequence resolution, a quantization step, a slice quantization parameter, an intra-prediction mode or an inter-prediction mode, or a temporal layer identifier.

Aspect 43. The non-transitory computer-readable medium of any of Aspects 41-42, wherein the set of threshold values includes sixteen threshold values.

Aspect 44. The non-transitory computer-readable medium of any of Aspects 41-43, wherein threshold values of the set of threshold values are monotonically increasing.

Aspect 45. The non-transitory computer-readable medium of any of Aspects 41-44, wherein threshold values of the set of threshold values are selected based on sample differences between the video data and other video data.

Aspect 46: An apparatus for processing video data, comprising one or more means for performing operations according to any of Aspects 11-20.

Aspect 47: An apparatus for processing video data, comprising one or more means for performing operations according to any of Aspects 36-40.

44

What is claimed is:

1. An apparatus for processing video data, the apparatus comprising:

at least one memory; and at least one processor coupled to the at least one memory, the at least one processor being configured to:

obtain video data;

determine a classification band for a first sample of the video data using at least chroma information from the first sample, collocated luma information, and collocated chroma information, the collocated luma information including luma information of a second sample that is collocated with the first sample or luma information of one or more samples neighboring the second sample, and the collocated chroma information including chroma information of a third sample that is collocated with the first sample;

determine a classification for the first sample based on the classification band, a first variable indicative of whether there is an edge between the second sample and a first neighboring sample of the one or more samples neighboring the second sample, and a second variable indicative of whether there is an edge between the second sample and a second neighboring sample of the one or more samples neighboring the second sample, the first variable determined based on whether a difference between a value of the second sample and a value of the first neighboring sample is less than a predetermined value and whether the difference between the value of the second sample and the value of the first neighboring sample is greater than a threshold, and the second variable determined based on a difference between the value of the second sample and a value of the second neighboring sample is less than the predetermined value and whether the difference between the value of the second sample and the value of the second neighboring sample is greater than the threshold; and filter at least the first sample of the video data based on the determined classification.

2. The apparatus of claim 1, wherein the at least one processor is further configured to use edge information to determine the classification band for the first sample of the video data, and wherein the edge information comprises information from a set of neighboring samples neighboring the first sample.

3. The apparatus of claim 2, wherein the edge information is based on at least one of the difference between the value of the second sample and the value of the first neighboring sample or the difference between the value of the second sample and the value of the second neighboring sample.

4. The apparatus of claim 1, wherein the chroma information comprises first chroma component information, and wherein the collocated chroma information comprises second chroma component information, the first chroma component information being different from the second chroma component information.

5. The apparatus of claim 1, wherein the at least one processor is further configured to determine the classification band from among a plurality of available classification bands.

6. The apparatus of claim 5, wherein the at least one processor is further configured to:

determine the classification band based on the collocated chroma information based on a number of available classification bands being greater than a threshold value.

7. The apparatus of claim 6, wherein the threshold value is a value of four.

8. The apparatus of claim 1, wherein the first sample is obtained from a position in a first picture of the video data, and wherein the collocated luma information and the collocated chroma information are obtained from a corresponding position of a second picture of the video data.

9. The apparatus of claim 1, wherein the predetermined value is a value of 0.

10. A method for processing video data, the method comprising:

obtaining video data;

determining a classification band for a first sample of the video data using at least chroma information from the first sample, collocated luma information, and collocated chroma information, the collocated luma information including luma information of a second sample that is collocated with the first sample or luma information of one or more samples neighboring the second sample, and the collocated chroma information including chroma information of a third sample that is collocated with the first sample;

determining a classification for the first sample based on the classification band, a first variable indicative of whether there is an edge between the second sample and a first neighboring sample of the one or more samples neighboring the second sample, and a second variable indicative of whether there is an edge between the second sample and a second neighboring sample of the one or more samples neighboring the second sample, the first variable determined based on whether a difference between a value of the second sample and a value of the first neighboring sample is less than a predetermined value and whether the difference between the value of the second sample and the value of the first neighboring sample is greater than a threshold, and the second variable determined based on a difference between the value of the second sample and a value of the second neighboring sample is less than the predetermined value and whether the difference between the value of the second sample and the value of the second neighboring sample is greater than the threshold; and filtering at least the first sample of the video data based on the determined classification.

11. The method of claim 10, further comprising using edge information to determine the classification band for the first sample of the video data, and wherein the edge information comprises information from a set of neighboring samples neighboring the first sample.

12. The method of claim 11, wherein the edge information is based on at least one of the difference between the value of the second sample and the value of the first neighboring sample or the difference between the value of the second sample and the value of the second neighboring sample.

13. The method of claim 10, wherein the chroma information comprises first chroma component information, and wherein the collocated chroma information comprises second chroma component information, the first chroma component information being different from the second chroma component information.

14. The method of claim 10, further comprising determining the classification band from among a plurality of available classification bands.

15. The method of claim 14, further comprising determining the classification band based on the collocated chroma information based on a number of available classification bands being greater than a threshold value.

16. The method of claim 15, wherein the threshold value is a value of four.

17. The method of claim 10, wherein the first sample is obtained from a position in a first picture of the video data, and wherein the collocated luma information and the collocated chroma information are obtained from a corresponding position of a second picture of the video data.

18. The method of claim 10, wherein the predetermined value is a value of 0.

19. A non-transitory computer-readable medium having stored thereon instructions that, when executed by at least one processor, cause the at least one processor to:

obtain video data;

determine a classification band for a first sample of the video data using at least chroma information from the first sample, collocated luma information and collocated chroma information, the collocated luma information including luma information of a second sample that is collocated with the first sample or luma information of one or more samples neighboring the second sample, and the collocated chroma information including chroma information of a third sample that is collocated with the first sample;

determine a classification for the first sample based on the classification band, a first variable indicative of whether there is an edge between the second sample and a first neighboring sample of the one or more samples neighboring the second sample, and a second variable indicative of whether there is an edge between the second sample and a second neighboring sample of the one or more samples neighboring the second sample, the first variable determined based on whether a difference between a value of the second sample and a value of the first neighboring sample is less than a predetermined value and whether the difference between the value of the second sample and the value of the first neighboring sample is greater than a threshold, and the second variable determined based on a difference between the value of the second sample and a value of the second neighboring sample is less than the predetermined value and whether the difference between the value of the second sample and the value of the second neighboring sample is greater than the threshold; and filter at least the first sample of the video data based on the determined classification.

20. The non-transitory computer-readable medium of claim 19, wherein the instructions further cause the at least one processor to use edge information to determine the classification band for the first sample of the video data, and wherein the edge information comprises information from a set of neighboring samples neighboring the first sample.

21. The non-transitory computer-readable medium of claim 20, wherein the edge information is based on at least one of the difference between the value of the second sample and the value of the first neighboring sample or the difference between the value of the second sample and the value of the second neighboring sample.

22. The non-transitory computer-readable medium of claim 19, wherein the chroma information comprises first chroma component information, and wherein the collocated chroma information comprises second chroma component information, the first chroma component information being different from the second chroma component information.

23. The non-transitory computer-readable medium of claim 19, wherein the instructions further cause the at least one processor to determine the classification band from among a plurality of available classification bands.

24. The non-transitory computer-readable medium of claim 23, wherein the instructions further cause the at least one processor to determine the classification band based on the collocated chroma information based on a number of available classification bands being greater than a threshold value.

25. The non-transitory computer-readable medium of claim 24, wherein the threshold value is a value of four.

26. The non-transitory computer-readable medium of claim 19, wherein the first sample is obtained from a position in a first picture of the video data, and wherein the collocated luma information and the collocated chroma information are obtained from a corresponding position of a second picture of the video data.

27. The non-transitory computer-readable medium of claim 19, wherein the predetermined value is a value of 0.

\*  \*  \*  \*  \*